UNITED STATES PATENT OFFICE.

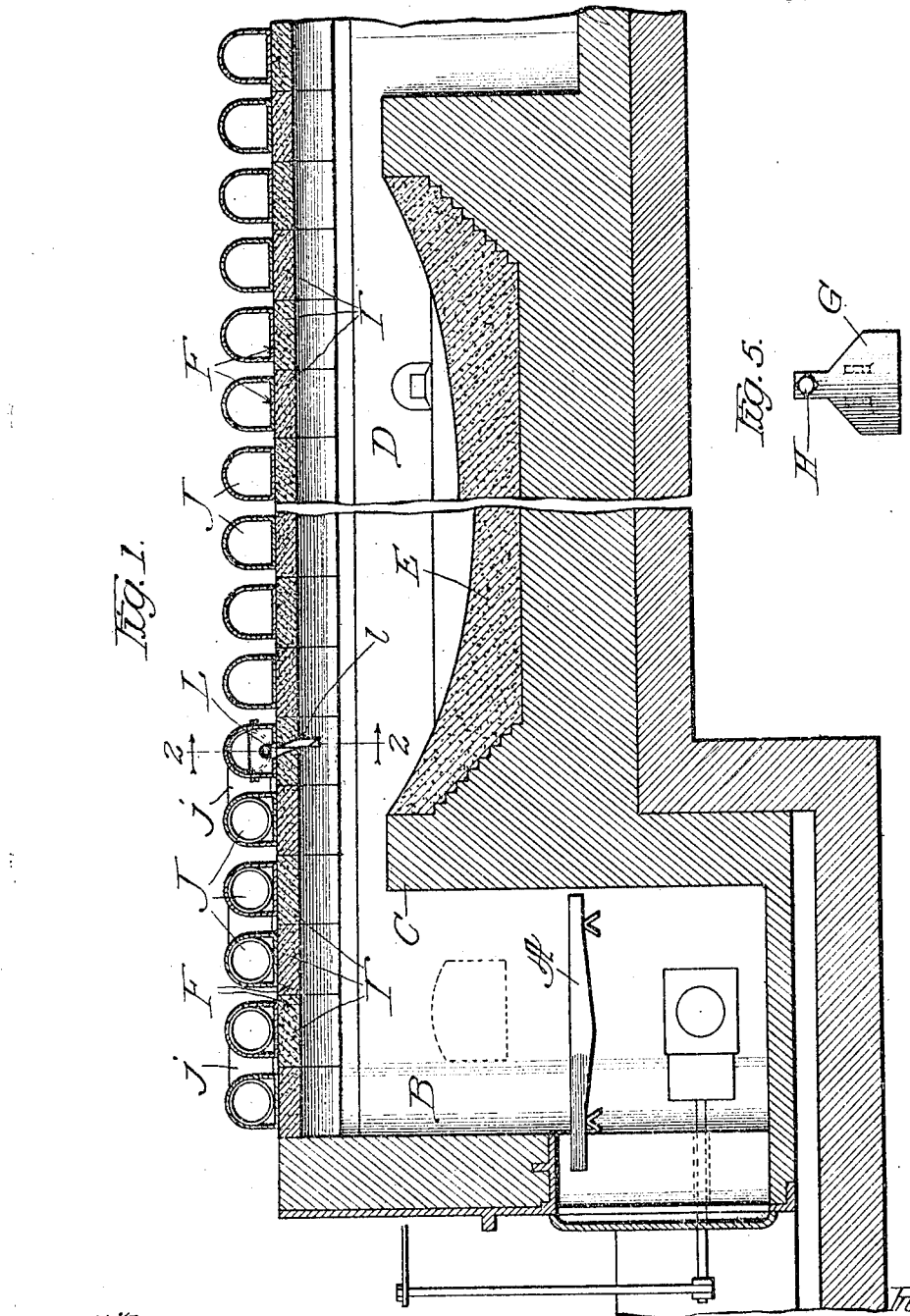

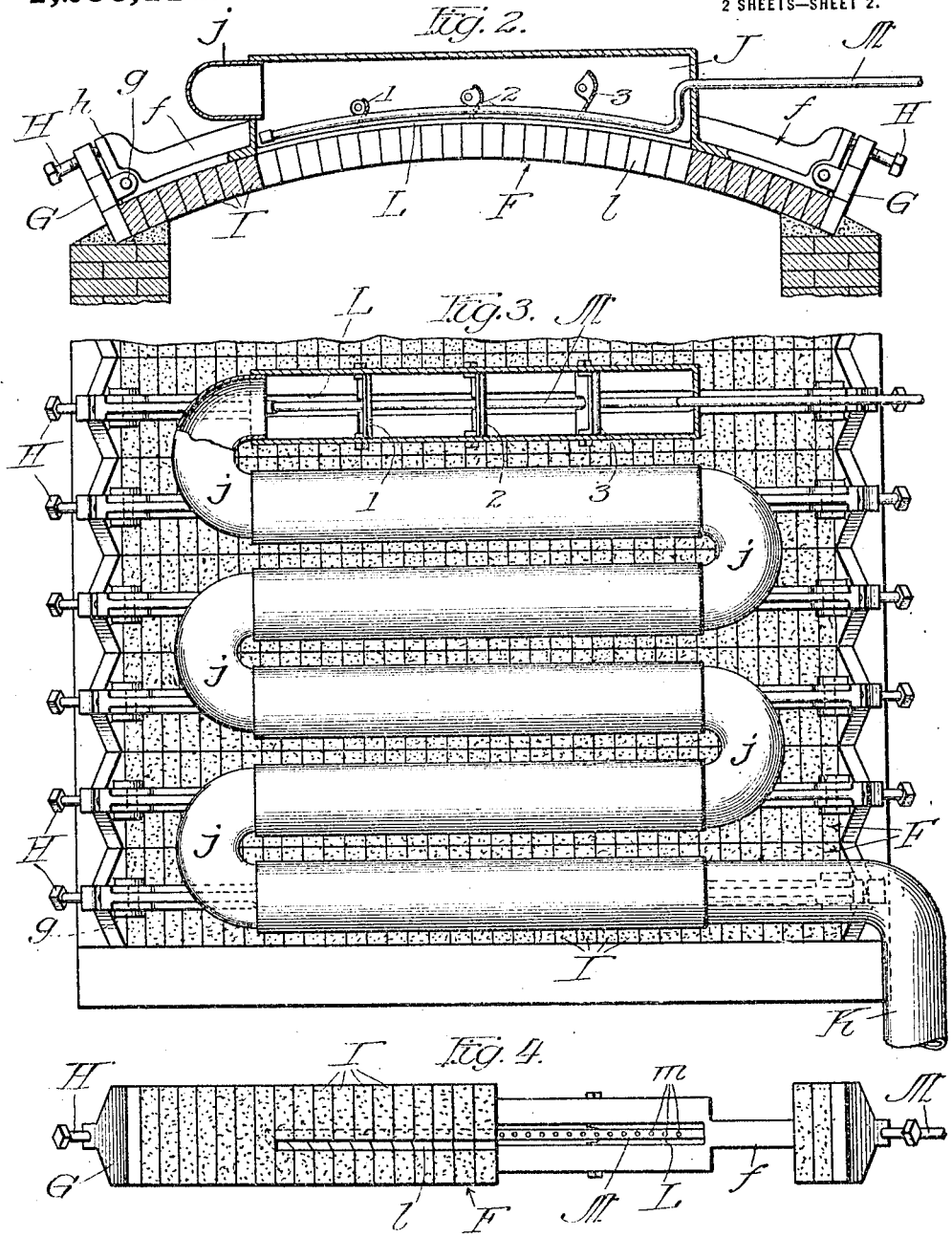

WILLIAM S. ROBINSON, OF BENTON HARBOR, MICHIGAN.

FURNACE CONSTRUCTION.

1,286,114.   Specification of Letters Patent.   Patented Nov. 26, 1918.

Application filed February 26, 1917.   Serial No. 150,915.

*To all whom it may concern:*

Be it known that I, WILLIAM S. ROBINSON, a citizen of the United States of America, and resident of Benton Harbor, Berrien county, Michigan, have invented a certain new and useful Improvement in Furnace Constructions, of which the following is a specification.

My invention relates to furnaces in general, for example, of that kind in which a hearth or bed is provided for melting metals thereon, and in which means are provided for supplying air to the smoke and gases passing from the combustion-chamber to the space above said hearth or bed, so that combustion will be promoted and intense heat produced to melt the metals.

Generally stated, the object of my invention is to provide an improved and highly efficient roof for a furnace of the foregoing general character, or for any other furnace.

A special object is to provide an improved construction and arrangement whereby the air will be heated before entering the furnace, and whereby the means for supplying the air will not interfere in any way with the removal of the units, either separately or together, which form the roof of the furnace.

Another object is to provide an improved construction and arrangement for mixing gas with the air, before the latter enters the furnace, thereby to promote combustion and raise the temperature in the melting-chamber.

It is also an object to provide certain details and features of construction and combinations tending to increase the general efficiency and serviceability of a furnace-roof of this particular character.

To the foregoing and other useful ends, my invention consists in matters hereinafter set forth and claimed.

In the accompanying drawings:—

Figure 1 is a longitudinal section of a melting furnace having the roof thereof provided with air-supply-means embodying the principles of my invention.

Fig. 2 is an enlarged cross-section on line 2—2 in Fig. 1.

Fig. 3 is a plan of a portion of the roof of the furnace shown in Fig. 1, with certain portions thereof shown in section.

Fig. 4 is a bottom plan of one of the units of which the roof of the furnace is composed, showing some of the bricks which form the lining or bottom of the roof removed to bring into view the bottom slot of the steel arch through which the air is supplied, and which arch constitutes a part of the clamp for holding the brick in the form of an arch.

Fig. 5 is a detail view of one of the clamping jaws.

As thus illustrated, my invention comprises a furnace having a grate A of any suitable, known or approved form, for the combustion-chamber B, and the usual bridge-wall C over which the products of combustion pass to the melting-chamber D at the rear of the furnace. Below this melting-chamber is a bed or hearth E, of silica sand or other suitable material, for supporting the materials to be melted. The roof of the furnace is formed by the units F, each of which is composed of a steel arch $f$ provided at its ends with clamps G, the latter being pivoted to the ends of the arch at $g$, and each clamp having a tightening-screw H threaded therein to bear against the adjacent end-portion $h$ of the arch. With this arrangement, the fire-bricks I of each unit are clamped between the two jaws G, by tightening the screws H, whereby each unit comprises an upper arch-shaped support of steel or other metal and a lower arch or lining of fire-brick. Taken together, the units F form the roof of the furnace. The metal arches $f$ have their central portions made hollow to provide air-chambers J, these chambers being detachably connected together by heavy sheet-metal pipes $j$, and the chamber of the end-arch being provided with an air-supply-pipe K, which latter can lead to a blower or other suitable source of supply. Each arch is thus formed with a dome-like elevation between the depressed ends thereof, so that each arch has an upstanding middle portion which is elongated to give the desired capacity, and whereby the top of the roof is formed by these domes which are easily accessible for various purposes. One of the units F (the one in which the section 2—2 is taken in Fig. 1) has its metal supporting structure provided with a longitudinal slot L in the bottom thereof, and this slot communicates with a slot $l$ formed in the bricks, so that the air after entering this particular unit will pass downward through said slots and into the smoke and gases passing from the combustion-chamber to the melting-chamber, thus increasing or promoting combustion and producing a higher temperature in the melting chamber. As the air passes through a number of the arches $f$ before it enters the unit having the slots L and $l$, it follows that the air is highly heated before it enters the furnace, thus avoiding any chilling of the products of combustion by the admission of air, and insuring better results.

It will also be seen that this unit having the slots L and $l$ is provided internally with baffles 1, 2 and 3, of different heights, thereby to deflect the incoming air downward at different points along the length of said slots, so that the influx of air will be divided or distributed evenly, practically so, over the melting-chamber.

It will be also be seen that a gas pipe M leads into the chamber J having the slot L, and is provided along its length with openings $m$ for the escape of the gas downward through said slot, whereby gaseous fuel may be added to the air, thereby to increase the combustion and produce a steady and intense heat within the melting-chamber.

The metal elbows $j$ are easily disconnected from the air-chambers of the arches, being outside of the furnace, and in this way the units F can be easily and conveniently removed, either separately or together, when it becomes necessary to repair them. For example, the fire-bricks I burn out, in a furnace of this kind, and other difficulties arise, making it necessary to remove one or more of the units for purposes of repair or substitution, and sometimes this occurs during the melting operation. In my improved construction, therefore, the units can be very quickly and easily removed, and the burned-out fire-bricks can be replaced with fresh ones, and the construction is such that the means for supplying air does not interfere in any way with the removal and replacement of the units.

As shown, the arches $f$ and their linings are supported by the side walls or masonry of the furnace. The hollow arches in front of the slotted arch can be connected therewith, in the manner shown. Also, the hollow arches in rear of the slotted arch can be connected therewith if such is desired. It is not entirely necessary, though, to connect all of the other arches with the slotted arch, by elbows, inasmuch as the connection of a few of these arches together will heat the air before it is discharged through the slot into the furnace. Also, the hollow chambers need not be employed on all of the arches, but in order to avoid the making of different forms of arches, they can all be of the kind shown and described, although the chambers of some of them may not be in use to heat the air.

These arches and their linings, which are sometimes called bungs, are easily inserted and removed, as explained, even during the operation of the furnace, and the repairing of the furnace is thereby very greatly facilitated.

It will be understood, of course, that I do not limit myself to any particular kind of furnace, inasmuch as a roof constructed in accordance with my invention can be used on various kinds of furnaces, and in different ways. The furnace shown is, therefore, merely illustrative of one use of my invention, and it is obvious that a roof of this character, or a roof embodying the principles of my invention, can be used on various other kinds of furnaces, without departing from the spirit of my invention. The arches or other supports, and their refractory heat-resisting linings, span the furnace, in any structure in which the roof is used, and the units F thus spanning the furnace are each removable without disturbing the others. Each unit F, as shown and described, is constructed to receive a fluid, such as air or other fluid, and to heat the same for any suitable or desired purpose.

As shown, therefore, each arch $f$ is provided with solid end portions and a hollow intermediate or middle portion, which latter may or may not have a slot L at the bottom thereof, depending upon the position of the arch in the furnace. The hollow middle portions of the arches constitute the top of the roof, while the lining I constitutes the bottom of the roof. Each arch and its lining, as previously shown, is adapted to be lifted or hoisted directly upward and removed without disturbing the other units of the roof.

The elongated dome J, having the slot L and the slot $l$ in its lining, is disposed over the front end of the melting hearth E, so that the hot air is discharged downwardly into the products of combustion as they enter the space over the hearth, and before they sweep over the metal which is melted or which is to be melted on the hearth. As shown, the dome J is in the form of an elongated enlargement or hollow formation disposed centrally of the metal arch, but it is obvious that an air-heating-dome of this kind can be employed in any suitable way, and may be of any suitable form and may be incorporated in the structure as a part of the roof in any suitable or desired manner. In any event, the air-heating-dome is so supported that it can be readily hoisted upward from the roof, without disturbing the balance of the roof, and in this way repairs and renewals can be made in a very simple and economical and expeditious manner. The air-supplying-apparatus, in other words, can be taken out of the furnace as a unit, and such removal does not necessitate any tearing apart or breaking down of the masonry, and does not disturb the balance of the roof.

What I claim as my invention is:—

1. In a furnace, a roof therefor having means for supplying air to the products of combustion, said means including a hollow arch having an outlet for discharging the air downwardly into the furnace, a firebrick lining supported by said arch, said lining having a passage registering with said outlet at the bottom of the arch, said outlet extending lengthwise of said arch along the under-side thereof, and means in the arch to deflect the air downward through and at intervals along the length of said outlet.

2. In a furnace, a roof therefor comprising a removable metal support spanning the furnace, said support having its middle portion formed with a chamber which forms the top of the roof and to receive a fluid, a lining of heat-resisting material on the underside of said support, and means to hold said lining in place, said roof including a plurality of additional such hollow supports, each support and its allotted lining being removable from the roof as a unit and without disturbing any of the other units thereof, and outside means for detachably connecting the chambers of said units together, one support and its lining having an outlet for the chamber thereof to discharge the fluid downward into the furnace.

3. In means for supplying air through a furnace roof to the combustion-chamber below, the combination of (1) a removable metal arch forming part of the roof and having solid end portions, and an upstanding intermediate hollow portion forming a dome-like elevation between said end portions and providing an air-chamber which forms a part of said air-supplying-means, and having an intake for said chamber, (2) means to removably support said solid end portions, so that the combined air-supplying device and roof-arch thus formed can be freely hoisted and removed without disturbing the remainder of the roof, (3) means whereby the air after passing through said chamber is discharged downwardly into the products of combustion within the furnace, and (4) a hearth for molten metal below said roof, said dome-like elevation being disposed over the front end portion of said hearth, whereby the heated air is supplied to the products of combustion as they enter the space above said hearth.

4. A structure as specified in claim 3, said means (3) comprising an outlet slot for the bottom of said hollow portion.

5. A structure as specified in claim 3, said means (3) comprising another similar arch having an outlet slot for the bottom thereof, and detachable means to discharge the air from the first arch into the second arch.

6. In means for supplying air through a furnace roof to the combustion-chamber below, the combination of (1) a removable metal arch having solid end portions, and an intermediate hollow portion forming an air-chamber, and having an intake for said chamber, (2) means to removably support said solid end portions, so that the combined air-supplying device and roof-arch thus formed can be raised and removed without disturbing the remainder of the roof, (3) means whereby the air after passing through said chamber is discharged downwardly into the products of combustion within the furnace, and (4) a plurality of similar arches, all forming the top of the roof, and detachable conduits between the arches, so that the air passes from one arch to another through said conduits, said means having an outlet slot in the bottom of one of said arches.

7. A structure as specified in claim 3, said means (3) comprising a slotted fire-brick lining on the bottom of said arch, said hollow portion having an outlet, and means on said solid end portions to clamp said lining in position to maintain the slot thereof in communication with said outlet.

8. In means for supplying air through a furnace roof to the combustion-chamber below, the combination of (1) a removable metal arch having solid end portions, and an intermediate hollow portion forming an air-chamber, and having an intake for said chamber, (2) means to removably support said solid end portions, so that the combined air-supplying device and roof-arch thus formed can be raised and removed without disturbing the remainder of the roof, (3) means whereby the air after passing through said chamber is discharged downwardly into the products of combustion within the furnace, and (4) means in said air-chamber to deflect the air downward at intervals longitudinally of said arch.

9. In means for supplying air through a furnace roof to the combustion-chamber below, the combination of (1) a removable metal arch having solid end portions, and an intermediate hollow portion forming an air-chamber, and having an intake for said chamber, (2) means to removably support said solid end portions, so that the combined air-supplying device and roof-arch thus formed can be raised and removed without disturbing the remainder of the roof, (3) means whereby the air after passing through said chamber is discharged downwardly into the products of combustion within the furnace, said roof including (4) one or more additional such arches, and (5) outside means for detachably connecting the air-chambers together, said discharge means (3) consisting of a slot in the bottom of one arch, so that the air passes through all of said arches before entering the furnace.

10. In a furnace, a roof therefor having means for supplying air to the products of combustion, said means including a hollow arch having an outlet for discharging the air downwardly into the furnace, said outlet extending lengthwise of said arch along the under-side thereof, and means in the arch to deflect the air downward through and at intervals along the length of said outlet.

11. In a furnace, a roof therefor comprising a removable metal support spanning the furnace, said support having its middle portion formed with a chamber which forms the top of the roof and to receive a fluid, said roof including a plurality of additional such supports, each support being removable from the roof as a unit and without disturbing any of the other units thereof, and outside means for detachably connecting the chambers of said units together, one support having an outlet for the chamber thereof to discharge the fluid downward into the furnace.

12. A structure as specified in claim 10, said deflecting means including a plurality of deflectors which are of different heights and which are disposed transversely of said outlet, substantially as described.

13. In apparatus for supplying heated air to the combustion chamber of a furnace, the combination of an elongated hollow dome providing an air-chamber (J) forming part of the roof of the furnace, means including extensions (f) from the ends of said air-dome to support said apparatus in position above the combustion chamber, an intake for one end of said air-chamber, said air-dome having a slot (L) extending longitudinally in the bottom of said air-chamber, a fireproof lining (I) for the bottom of said air-dome, which lining also covers the bottom of said extensions of the air-dome, there being a slot (l) in said lining, and a hearth (E) for molten metal below said roof, said air dome being disposed over the front end portion of said hearth, whereby the heated air is supplied to the products of combustion as they enter the space above said hearth, the two slots being substantially of the same length, and said lining being exposed to the fire between the ends of the slot thereof (l) and the sides of the furnace.

14. The combination of claim 13, said air-chamber having means (1, 2 and 3) to deflect the air downward to said slots.

15. The combination of claim 13, and a gas pipe (M) leading to said air-chamber and extending inside thereof immediately above said slots.

16. In apparatus for supplying heated air to the combustion chamber of a furnace, the combination of a hollow dome forming a part of the roof of the furnace, having an intake for the air and a bottom outlet to discharge the heated air into the combustion chamber of the furnace, supporting means whereby said dome is readily removable upwardly without disturbing the balance of the roof, and a hearth for molten metal below said roof, said dome being disposed over the front end portion of said hearth, whereby the heated air is supplied to the products of combustion as they enter the space above said hearth.

17. In apparatus for supplying heated air to the combustion chamber of a furnace, the combination of a hollow dome forming a part of the roof of the furnace, having an intake for the air and a bottom outlet to discharge the heated air into the combustion chamber of the furnace, supporting means whereby said dome is readily removable upwardly without disturbing the balance of the roof, and means in said dome to deflect the air downward therein.

Signed by me at Chicago, Illinois, this 10th day of February, 1917.

WILLIAM S. ROBINSON.

Copies of this patent may be obtained for five cents each, by addressing the "Commissioner of Patents, Washington, D. C."